(12) United States Patent
Balakannan et al.

(10) Patent No.: US 11,838,701 B2
(45) Date of Patent: Dec. 5, 2023

(54) SYSTEMS AND METHOD FOR AUTOMATICALLY CONFIGURING PORTS IN BREAKOUT OR NON-BREAKOUT MODE

(71) Applicant: Cisco Technology, Inc., San Jose, CA (US)

(72) Inventors: Prabhu Balakannan, Milipitas, CA (US); Shrawan Chittoor Surender, Pleasanton, CA (US); Ashwin Ramani, Sunnyvale, CA (US); Eshwar Yedavalli, Fremont, CA (US); Srinivas Gaddam, San Jose, CA (US); Umamaheswararao Karyampudi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 17/342,820

(22) Filed: Jun. 9, 2021

(65) Prior Publication Data

US 2022/0400322 A1 Dec. 15, 2022

(51) Int. Cl.
*H04Q 11/00* (2006.01)

(52) U.S. Cl.
CPC ..... *H04Q 11/0066* (2013.01); *H04Q 11/0005* (2013.01); *H04Q 2011/0041* (2013.01); *H04Q 2011/0079* (2013.01); *H04Q 2011/0086* (2013.01)

(58) Field of Classification Search
CPC .......... H04Q 11/0066; H04Q 11/0005; H04Q 2011/0041; H04Q 2011/0079; H04Q 2011/0086; Y02D 30/00; H04L 49/25; G02B 6/3853; H04B 10/07; G06F 13/4004

See application file for complete search history.

(56) References Cited

U.S. PATENT DOCUMENTS

| | | | |
|---|---|---|---|
| 2015/0268418 A1* | 9/2015 | Sevigny | G02B 6/3853 385/50 |
| 2015/0363343 A1* | 12/2015 | Adhikesavalu | G06F 13/4004 710/104 |
| 2019/0081881 A1* | 3/2019 | Ranjal | H04L 49/25 |

FOREIGN PATENT DOCUMENTS

| | | | | |
|---|---|---|---|---|
| CN | 109104798 A | * | 12/2018 | |
| CN | 110838933 A | * | 2/2020 | ............. H04B 10/07 |

* cited by examiner

*Primary Examiner* — Vinncelas Louis
(74) *Attorney, Agent, or Firm* — Meunier Carlin & Curfman LLC

(57) ABSTRACT

In one embodiment, systems and method for detecting the intent of a connected optics/cable to operate in either a breakout mode or a non-breakout mode are provided. When a optics/cable is used to connect a port of a spine node to ports of one or more leaf nodes, initially both the spine node and the leaf nodes may automatically configure themselves to operate in breakout mode depending on the optics. Later, the spine node and one or more leaf nodes may exchange speed and optics information using a link layer discovery protocol or another protocol. If the exchanged speed and optics information indicates a mismatch, then the spine node or the leaf node may retain the breakout mode. If the exchanged speed and optic information do not indicate a mismatch, then the spine nodes and the leaf nodes may automatically re-configure themselves in non-breakout mode.

20 Claims, 9 Drawing Sheets

800

SYSTEMS AND METHOD FOR AUTOMATICALLY CONFIGURING PORTS IN BREAKOUT OR NON-BREAKOUT MODE

BACKGROUND

The spine-leaf (or core-access) fabric connections in data centers are typically high-speed network connections such as 40 Gbps, 100 Gbps and 400 Gbps connections. There are cases where a spine node needs to break out a port in the fashion of 4×25 Gbps, 4×100 Gbps or 4×10 Gbps to connect a greater number of leaf nodes for extending the network fabric.

In current software defined networks, the breakout configuration for a port is a user-applied policy that is applied via a controller. To achieve a spine-leaf port breakout, the type of breakout cable connecting the leaf and node ports should be auto-detected such that the breakout configuration can be auto applied.

However, there are current problems associated with automatically applying breakout configurations in this manner. In particular, many specialized optics (e.g., 400 G DR4 optics) can operate in breakout or non-breakout mode based on the cable connected and therefore it is not possible to find which cable the user has connected and its intent since the optics does not have information about the cable connected externally.

BRIEF DESCRIPTION OF THE DRAWINGS

The following detailed description of illustrative embodiments is better understood when read in conjunction with the appended drawings. For the purpose of illustrating the embodiments, example constructions of the embodiments are shown in the drawings; however, the embodiments are not limited to the specific methods and instrumentalities disclosed. In the drawings.

DESCRIPTION OF EXAMPLE EMBODIMENTS

Overview

Figure 1:
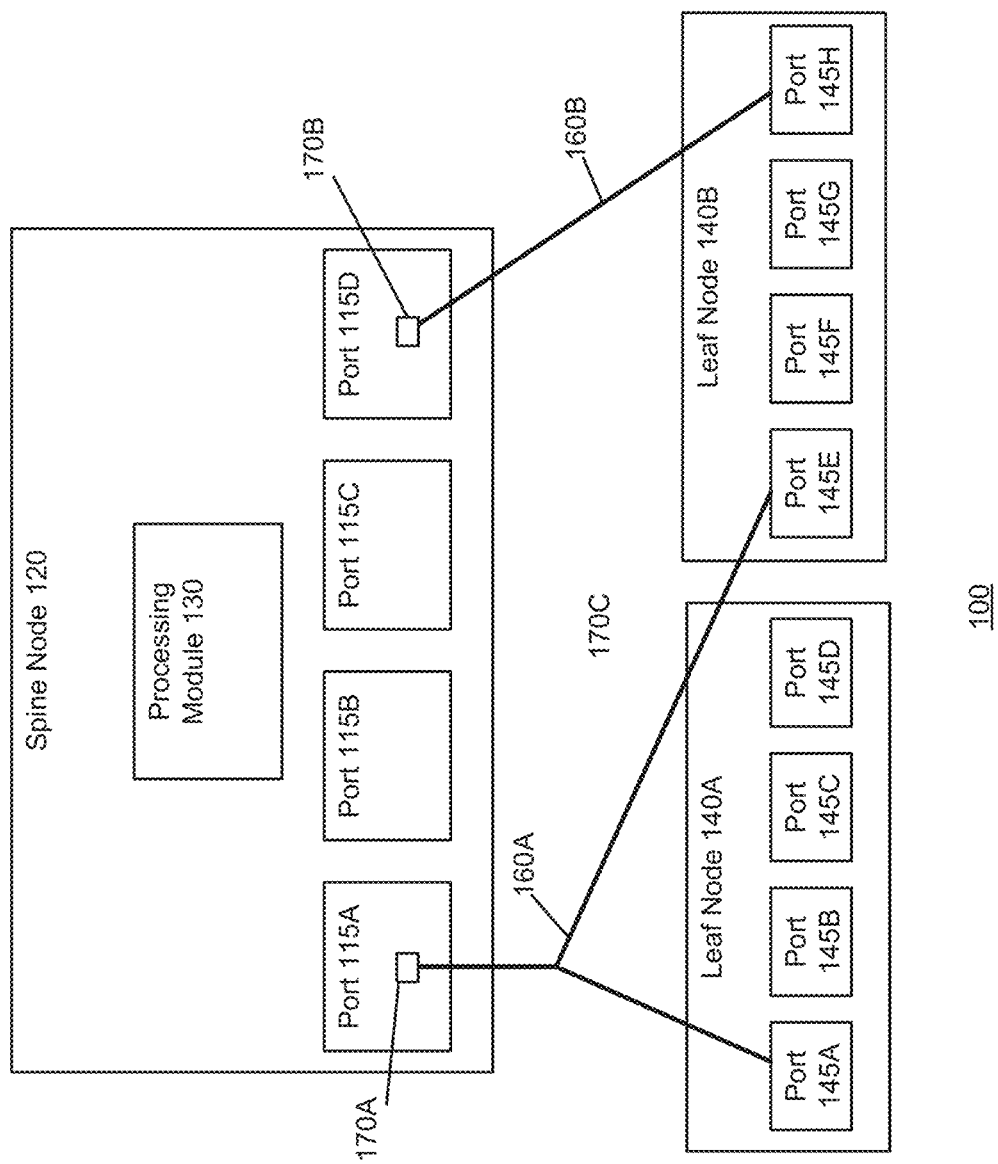
FIG. 1 is an illustration of an exemplary environment for operating a spine node and a plurality of leaf nodes.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments.

In one embodiment, systems and method for detecting the intent of a connected cable to operate in either a breakout mode or a non-breakout mode is provided. When a cable is used to connect a port of a spine node (e.g., switch) to ports of one or more leaf nodes (e.g., switches), initially both the spine node and the leaf nodes automatically configure themselves to operate in breakout mode per a breakout configuration based on the optics of the cable. Assuming the link is up with the proper cable, the spine node and one or more leaf nodes may exchange speed and optics information using a link layer discovery protocol ("LLDP") or another protocol. If the exchanged speed and optics information indicates a mismatch, then the node which did the auto-breakout (leaf or spine) retains the breakout mode for that interface. However, if the exchanged speed and optics information do not indicate a mismatch, then the spine node and the leaf node may re-configure themselves in non-breakout mode for that interface to operate at an intended high-speed.

In an embodiment, a spine node is provided. The spine node includes: a plurality of ports; and a processing module. The processing module may be configured to: detect a optics of a cable that can operate in breakout or non-breakout mode connected to any of the plurality of ports; configure the port to operate in a breakout mode based on the optics on either of the nodes and the cable connecting them; exchange speed and optics information between the nodes using link-layer discovery protocol or similar protocol after the link is up; and based on the exchanged speed and optics information, either allow the port to remain in the breakout mode or re-configure the ports to operate in a non-breakout mode on either side.

Implementations may include some or all of the following features. The cable may be a breakout cable, and the processing module may be further configured to detect a type of the optics by reading SPROM or EEPROM content stored on the optics. Configuring the port of the spine node to operate in the breakout mode may include applying an internal breakout configuration to the port. The cable may be an optical cable. The optical cable may be a breakout or non-breakout cable. The processing module may be further configured to: based on the exchanged speed and optics information determine that there is a mismatch between the first port and the second port; and in response to the determination of the mismatch, allow the first port to remain operating in the breakout mode. The processing module may be further configured to: based on the exchanged speed and optics information determine that there is no mismatch between the first port and the second port; and in response to the determination of no mismatch, re-configure the first port of the spine node to operate in the non-breakout mode. The speed and optics information may be exchanged using a link layer discovery protocol.

In an embodiment, a method is provided. The method includes detecting an optics of a cable connected to a port of a spine node, wherein the cable connects a port of a leaf node to the port of the spine node; configuring the port of the spine node to operate in a breakout mode based on the optics; exchanging speed and optics information with the leaf node by the spine node; and based on the exchanged speed and optics information, either allowing the port of the spine node to remain in the breakout mode or re-configuring the port to operate in a non-breakout mode by spine node.

Embodiments may include some or all of the following features. The method may further include: detecting the optics of the cable connected to the port of the leaf node; and configuring the port of the leaf node to operate in the breakout mode by the leaf node. The cable may be a breakout cable, and the method may further include detecting a type of the optics by reading SPROM or EEPROM content stored on the cable. Configuring the port of the leaf node to operate in the breakout mode may include applying a breakout configuration to the port of the leaf node. The cable may be an optical cable. The optical cable may be a breakout cable. The method may further include: based on the exchanged speed and optics information, determining that there is a mismatch between the port of the spine node and the port of the leaf node; and in response to the determination of the mismatch, allowing the port of the leaf node to operate in the breakout mode. The method may further include: based on the exchanged speed and optics information, determining that there is no mismatch between the port of the spine node and the port of the leaf node; and in response to the determination of no mismatch, configuring the port of the leaf node to operate in the non-breakout mode. The speed and optics information is exchanged using a link layer discovery protocol.

In an embodiment, a system is provided. The system includes: a spine node comprising a first plurality of ports; and a leaf node comprising a second plurality of ports. The spine node is configured to: detect optics of a cable connected to a first port of the first plurality of ports, wherein the cable connects the first port to a second port of the second plurality of ports; configure the first port to operate in a breakout mode; exchange speed and optics information with the leaf node; and based on the exchanged speed and optics information, either allow the first port of the spine node to remain in the breakout mode or configure the first port to operate in a non-breakout mode.

Embodiments may have some or all of the following features. The leaf node may be configured to: detect the cable connected to the second port of the leaf node; and configuring the second port of the leaf node to operate in the breakout mode by the leaf node. The leaf node and the spine node may be switches.

Example Embodiments

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an exemplary environment 100 for operating a spine node 120 and a plurality of leaf nodes 140 (i.e., the leaf nodes 140A and 140B). In some embodiments, the spine node 120 and each of the leaf nodes 140 may be switches and may be implemented in part using one or more general purpose computing devices such as the computing device 900 illustrated with respect to FIG. 9. While only one spine node 120 and two leaf nodes 140 are shown it is for illustrative purposes only. There is no limit to the number of spine nodes 120 and leaf nodes 140 may be supported.

Generally, the leaf-spine architecture is a way of creating a network topology or fiber that comprises a spine layer and a leaf layer. The spine nodes 120 in the spine layer perform general routing for the network, while the leaf nodes 140 in the leaf layer connect to endpoint devices like computers, servers, and other devices. Advantages of the leaf-spine network include improved latency, reduced bottlenecks and expanded bandwidth.

As shown, the spine node 120 includes a processing module 130 and one or more ports 115 (i.e., the ports 115A-D). The ports 115 may be any type of port that is commonly used to interface with a network device such as a leaf node 140. While only four ports 115 are show, it is for illustrative purposes only. More or fewer ports 115 may be supported by each spine node 120.

Each leaf node 140 may similarly include a processing module 130 (not shown) and one or more ports 145. In the example shown, the leaf node 140A includes the ports 145A-D and the leaf node 140B includes the ports 145E-H. The ports 145 may be a same type of port at the ports 115. More or fewer ports 145 may be supported by each leaf node 140.

Generally, a port on the spine node 120 may be connected to one or more leaf nodes 140 in what is referred to as a breakout mode or a non-breakout mode. In the breakout mode or configuration, a single port 115 of the spine node 120 is connected to multiple ports 145 of one or more leaf nodes 140B. In the example shown, the port 115A is connected via a cable 160A to both the port 145A of the leaf node 140A and the port 145E of the leaf node 140B. The cable 160A includes optics 170A.

In the non-breakout mode or configuration, a single port 115 of the spine node 120 is connected to a single port 145 of a leaf node 140. In the example shown, the port 115D is connected via a cable 160B to the port 145H of the leaf node 140B. The cable 160B includes optics 170B.

Examples of cables that may be used in the breakout mode and the non-breakout mode include optical cables such as SMF cables or Direct-Attach cables ("DAC"). In general, DAC cables may include a memory that may indicate whether the DAC cable is being used in a breakout or non-breakout mode. Suitable memories include electrically erasable programmable read-only memory ("EPROM") or serial programmable read only memory ("SPROM").

However, DAC cables may be limited to runs of less than a few meters in length, while optical cables may be capable of runs over a hundred meters. This is particularly problematic in data centers where system architects may desire to place leaf nodes 140 far from the associated spine nodes 120. Thus, while optical cables are preferable over DAC cables due to their run length, the lack of memory in optical cables makes the automatic configuration of leaf and spine nodes in breakout or non-breakout modes using optical cables more difficult.

Accordingly, to solve the problem noted above, in some embodiments, from the perspective of a spine node 120 and considering the optics 170A of the cable 160A, when the processing module 130 of the spine node 120 detects the optics 170A in the port 115A, the processing module 130 may first guess that cable 160A is connected in breakout mode and may automatically configure the port 115A to operate in the breakout mode according to a configuration file that may be set by an administrator. The processing modules of the leaf node 140A and the leaf node 140B detect the optics 170A connected through cable 160A as non-breakout capable optics and configure the ports 145A and 145B to operate at a corresponding speed.

After configuration, the processing module 130 of the spine node 120 may exchange information with the leaf nodes 140A and 140B that includes optics type and speed information observed on each of the ports 115A, 145A, and 145E. Because the exchanged optics and speed information will not match, the leaf nodes 140A and 140B, and the spine node 120, will each assume that they are in fact connected by the breakout cable 160A and the spine node 120 will remain in breakout mode.

From the perspective of a spine node 120 and considering the cable 160B, when the processing module 130 of the spine node 120 detects the optics 170B in the port 115D, the processing module 130 may first guess (wrongly) that cable 160B is connected in breakout mode and may automatically configure the port 115D to operate in the breakout mode according to the optics 170B in the port 115D. The processing module of the leaf node 140B may similarly automatically configure itself in breakout mode in response to detecting the optics 170B of the cable 160B in the port 145H.

After configuration, the processing module 130 of the spine node 120 may exchange information with the leaf node 140B that includes optics type and speed information observed on each of the ports 115D and 145H as described above. Because the exchanged optics and speed information will match, the leaf node 140B and the spine node 120 will both determine that they are connected by the non-breakout cable 160B and should be configured for non-breakout mode instead of for breakout mode. Each of the spine node 120 and the leaf node 140B may then reconfigure itself to operate in the non-breakout mode according to user intention, for example.

Figure 2:
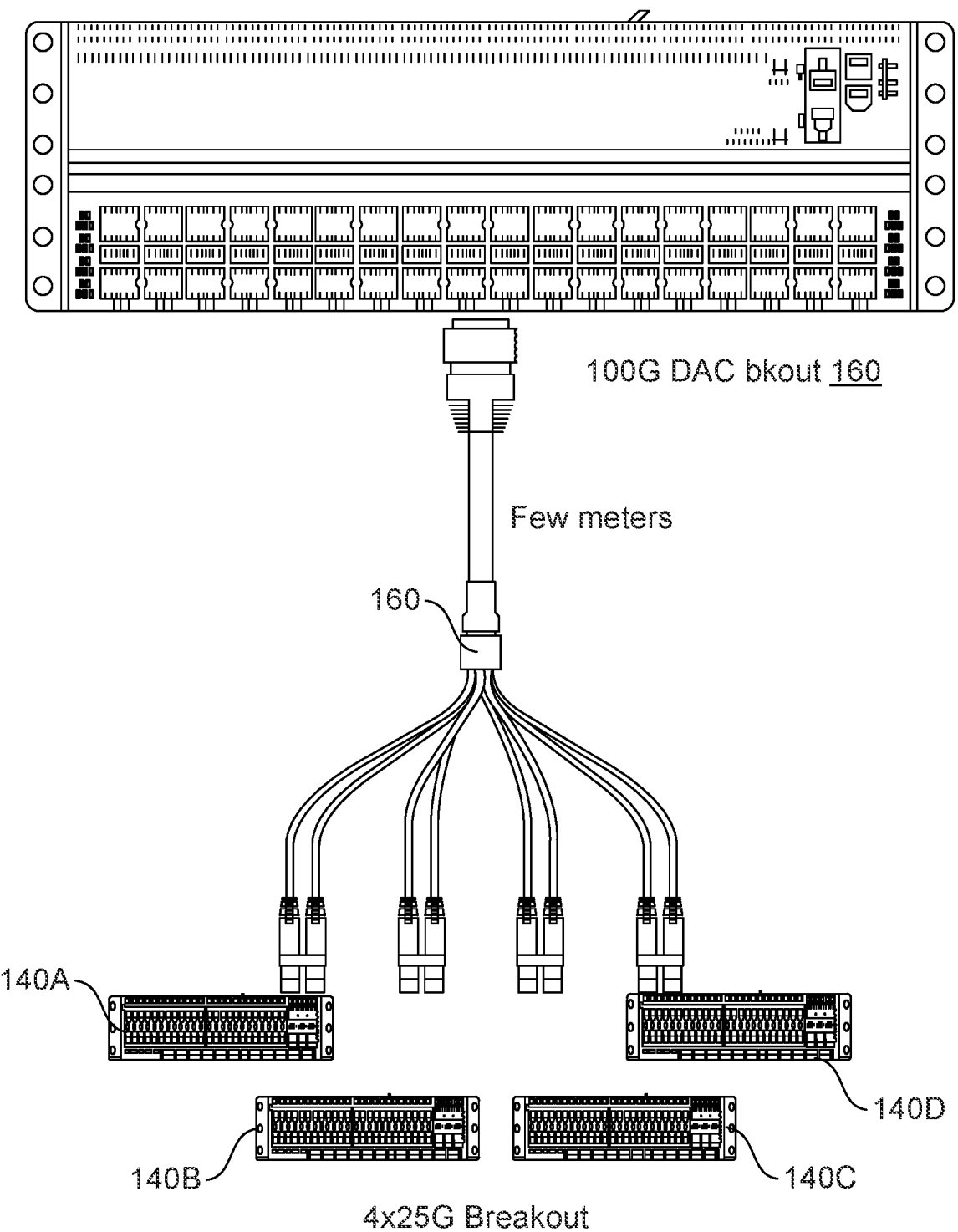
FIG. 2 is an illustration of an example spine switch connecting to a plurality of leaf switches with a cable (short distance 4×25 G cable)

FIG. 2 is an illustration of an example spine switch (i.e., spine node) 120 connecting to a plurality of leaf switches 140 (i.e., the leaf nodes 140A-D) with a cable 160. In the example shown, the cable 160 is a 100 G DAC breakout cable that connects at 100 Gbs to a port of the spine switch 120 and connects to a port of each of the leaf switches 140 at 25 Gbs. Because the cable 160 is a DAC cable it is limited to a few meters.

When the cable 160 is inserted into the spine switch 120 and the leaf switches 140A-D, the processing modules of the spine switch 120 and the leaf switches 140 may read the memory of the cable 160 to determine the type of the cable 160 (i.e., DAC) and determine that the cable/optics 160 is a breakout DAC cable. Accordingly, the spine switch 120 will configure in breakout mode and each of the leaf switches 140 may read the cable/optics as non-breakout capable optics and configure the port in corresponding speed (25 G in this case).

After configuration and link is up, the processing module of the spine switch 120 may perform a handshaking procedure with each of the leaf switches 140 where optics type and speed information may be negotiated and/or exchanged. For example, the spine switch 120 may indicate that it can communicate at 100 Gbs, and each of the leaf switches 140 may indicate that they can communicate at 25 Gbs. Each of the leaf switches 140 and the spine switch 120 may recognize the mismatch of speeds as proof that they should remain in the breakout mode. In some embodiments, the switches may exchange the optics and speed information using a type-length-value ("TLV") scheme sent via LLDP. Other methods may be used.

Figure 3:
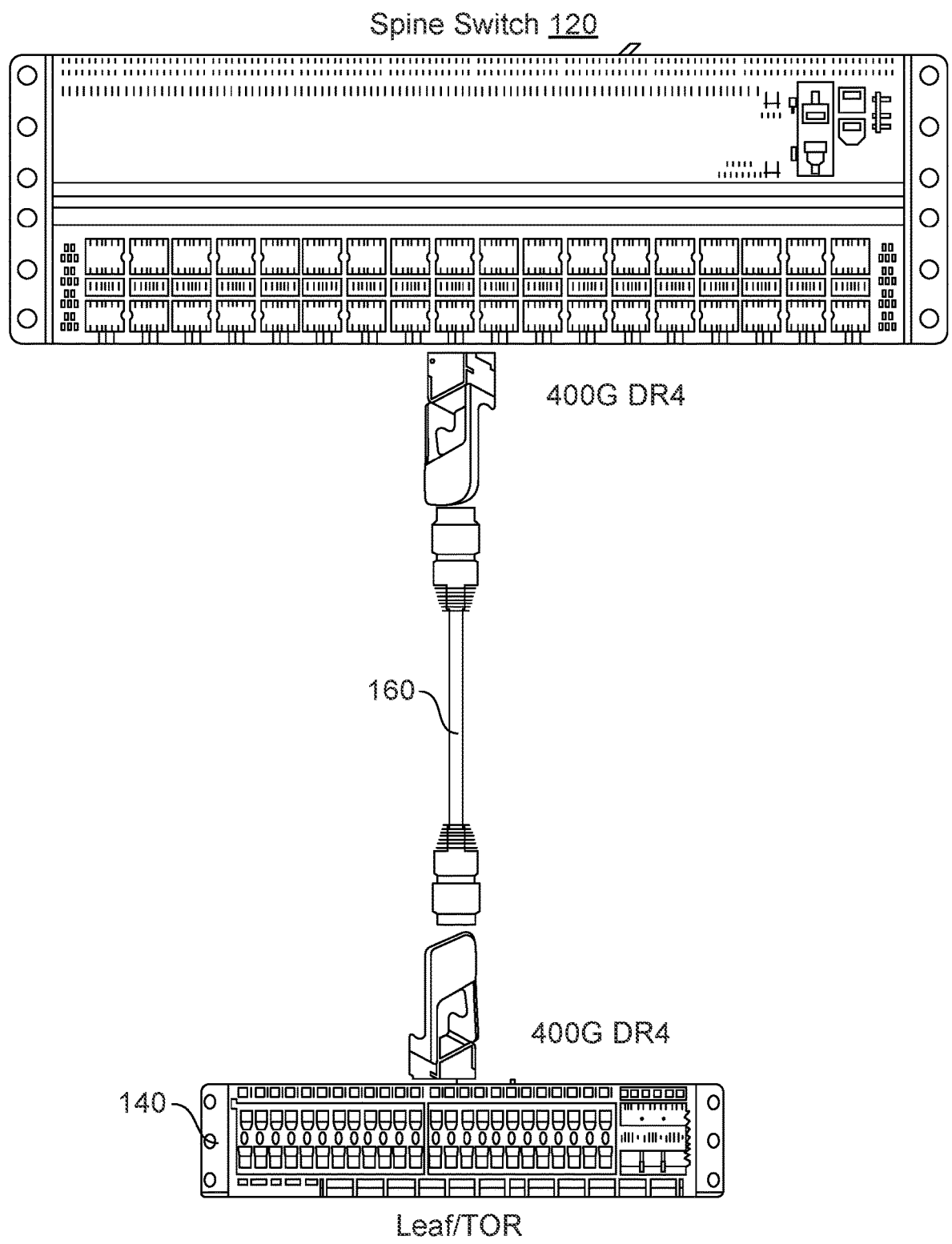
FIG. 3 is an illustration of an example spine switch connecting to a single leaf switch with a cable.

FIG. 3 is an illustration of an example spine switch (i.e., spine node) 120 connecting to a single leaf switch 140 (i.e., the leaf/TOR switch) with a cable 160. In the example shown, the cable 160 is an optical cable, specifically a SMF cable, capable of communicating at 400 Gbs. The cable 160 connects a single port of the spine switch 120 to a single port of the leaf switch 140 and is not connected in breakout mode. Because the cable 160 is an optical cable it may have a length of several hundred meters.

When the cable 160 is inserted into the spine switch 120 and the leaf switch 140, the processing modules of the spine switch 120 and the leaf switch 140 may determine that the cable 140 is an optical cable (or at least not a DAC cable) due to its lack of memory. However, the processing modules may nonetheless assume that the cable 140 is connected in breakout mode and may each automatically configure themselves in breakout mode according to the optics capability.

After configuration and link is up, the processing module of the spine switch 120 may perform a handshaking procedure with the leaf switch 140 and may determine that the speeds and optics used to communicate by the switches 120 and 140 are the same. For example, the spine switch 120 may indicate that it can communicate at 400 Gbs and the leaf switch 140 may indicate it can communicate at 400 Gbs with the same type of optics. The leaf switch 140 and the spine switch 120 may recognize the matching speeds and optics as proof that they should be in the non-breakout mode rather than the breakout mode, to maximize bandwidth. Accordingly, both the spine switch 120 and the leaf switch 140 may each configure themselves to operate in the non-breakout mode.

Figure 4:
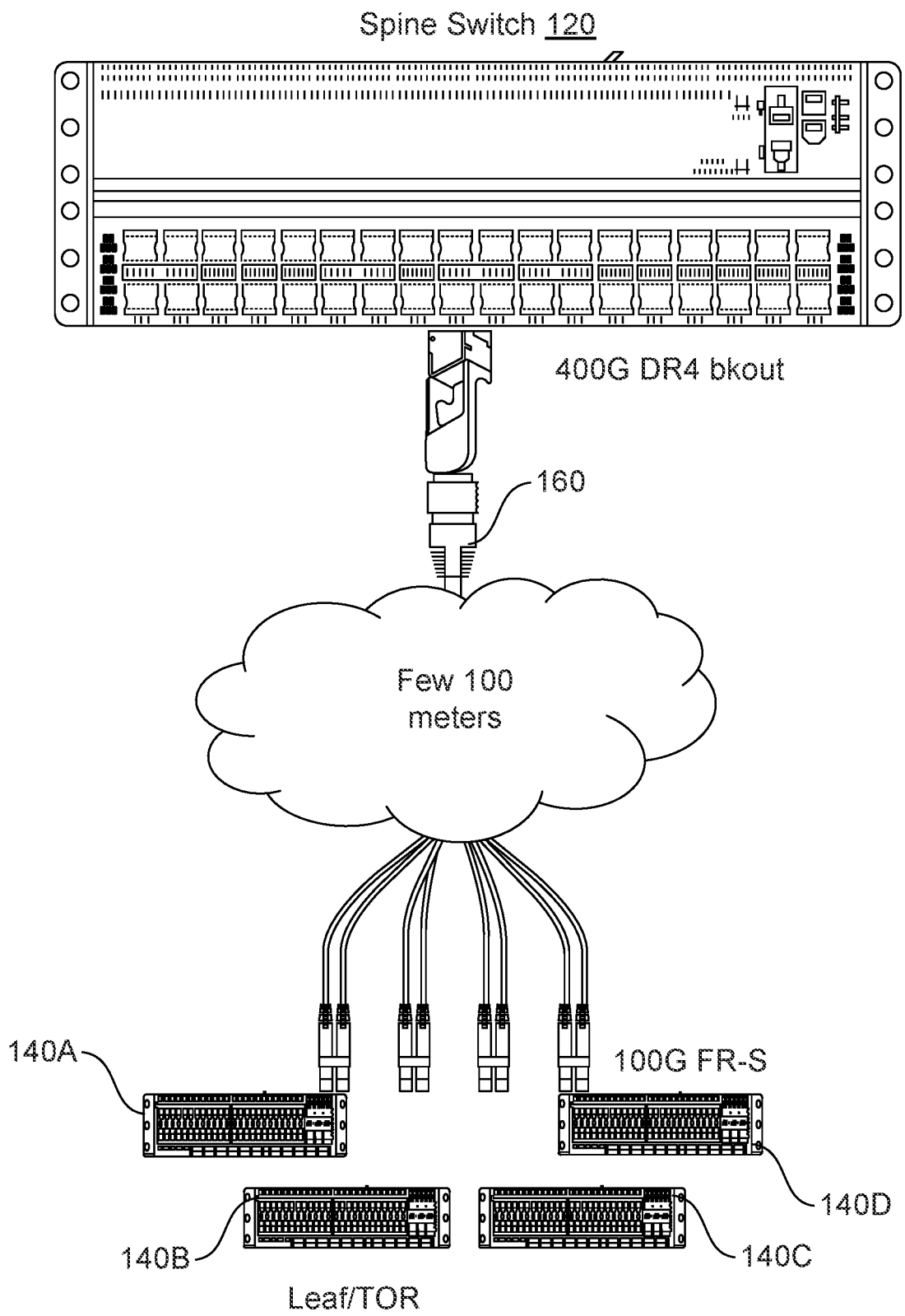
FIG. 4 is an illustration of an example spine switch connecting to multiple leaf switch with a cable (long distance with 4×100 G cable)

FIG. 4 is an illustration of an example spine switch (i.e., spine node) 120 connecting to multiple leaf switch 140 (i.e., the leaf switches 140A-D) with a cable 160. In the example shown, the cable 160 is an optical cable, specifically a breakout cable capable of communicating at 4×100 Gbs. The cable 160 connects a single port of the spine switch 120 to a single port of each of the leaf switches 140 and is connected in breakout mode.

When the cable 160 is inserted into the spine switch 120 and each of the leaf switches 140, the processing modules of the spine switch 120 and the leaf switch 140 may determine that the cable 140 is an optical cable due to its lack of memory. However, the processing modules of spine node may nonetheless assume that the cable 160 is connected in breakout mode and the spine switch 120 may automatically apply breakout mode according to the optics and each of the leaf switches 140 will read the optics data and assume it is non-breakout capable optics/cable and configure a corresponding speed (100 G in this case) on its ports.

After configuration and a link is up, the processing module of the spine switch 120 may perform a handshaking procedure with the leaf switch 140 and may determine that the speeds used to communicate by the switches 120 and each of the switches 140 are different. For example, the spine switch 120 may indicate that it can communicate at 400 Gbs and each of the leaf switches 140 may indicate that they can communicate at 100 Gbs. The leaf switches 140 and the spine switch 120 may each recognize the speed mismatch as proof that they should be connected in breakout mode. Accordingly, the spine switch 120 may remain configured in breakout mode.

Figure 5:
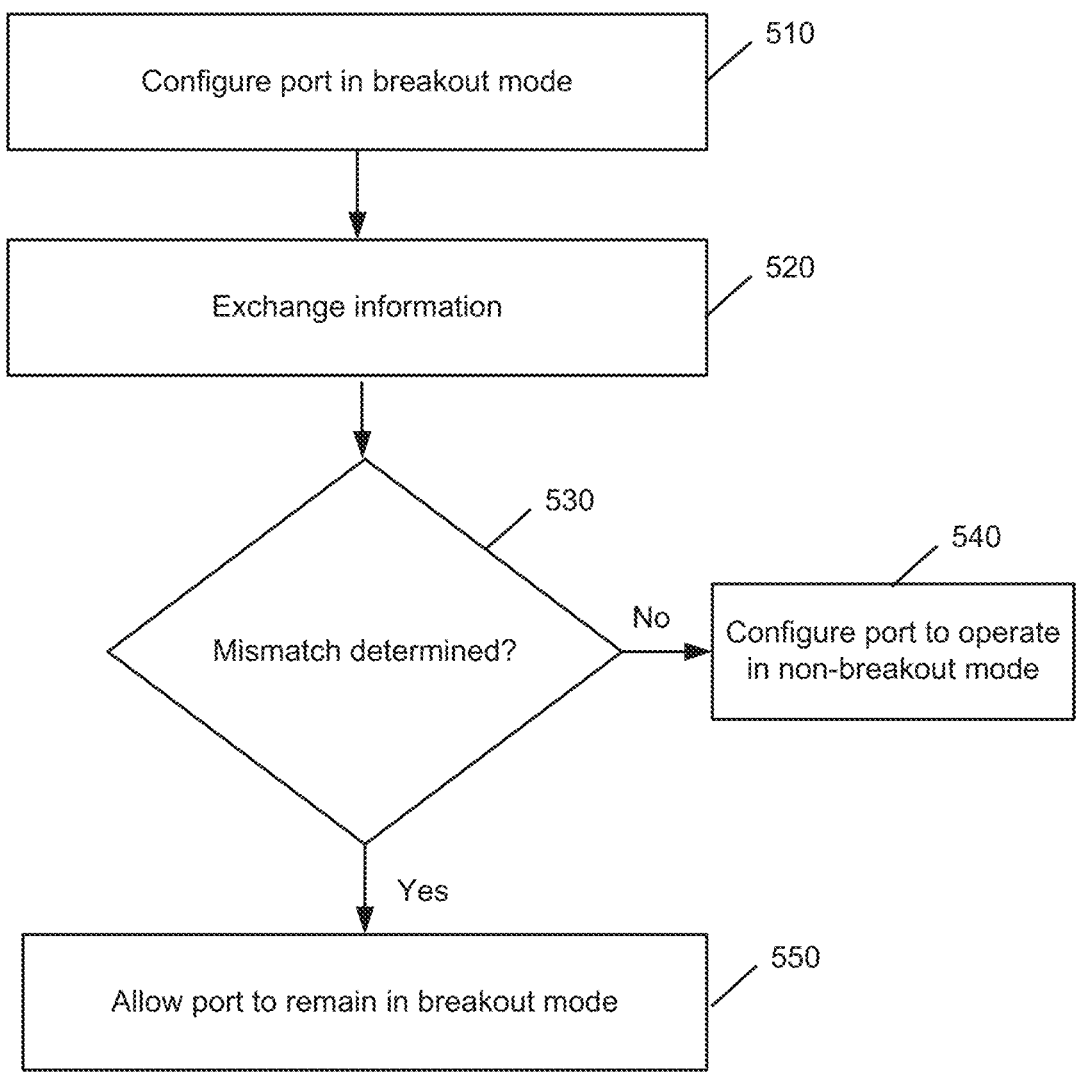
FIG. 5 is an operational flow of an implementation of a method for configuring a port to operate in either a breakout or a non-breakout mode.

FIG. 5 is an operational flow of an implementation of a method 500 for configuring a port to operate in either a breakout or a non-breakout mode. The method 500 may be implemented by one or both of a spine node 120 and a leaf node 140.

At 510, a port is configured to operate in breakout mode. The port may be configured by a processing module of either a spine node 120 or a leaf node 140. In some embodiments, a driver associated with the port may detect the presence of an optics/cable 160 in the port via a hardware signal. The optics/cable 160 may be an optical cable or a DAC cable. The driver may read the contents of the memory of the cable 160 (e.g., SPROM or EPROM) and may pass the contents to a user-space port manager, which may be an OS process handling ethernet interfaces. The port manager may then configure the port to operate in a breakout mode according to an optics, for example.

At 520, information is exchanged. The information may be exchanged between the spine node 120 and the leaf node 140 through the optics/cable 160. The information may include the speed and optics type of the cable 160 as detected by each node. In some embodiments, the information may be encoded into a specialized TLV packet and may be exchanged via LLDP. Other methods for exchanging information may be used.

At 530, whether there is a mismatch in the exchanged information is determined. The mismatch may be determined by the processing modules on both of the leaf node(s) 140 and the spine node 120. Depending on the embodiment, a mismatch may be determined when either the exchanged optics type or speed information does not match. Any methods for determining mismatches may be used. If a mismatch is determined the method 500 may continue at 550. If no mismatch is determined then the method 500 may continue at 540.

At 540, the port is configured to operate in non-breakout mode. The port may be configured by the processing modules on both of the leaf node(s) 140 and the spine node 120. In some embodiments, the port may be configured to operate in non-breakout mode. Other methods may be used.

At 550, the port is allowed to remain in breakout mode. The port may be allowed to remain in breakout mode by the processing modules on both of the leaf node(s) 140 and the spine node 120.

Figure 6:
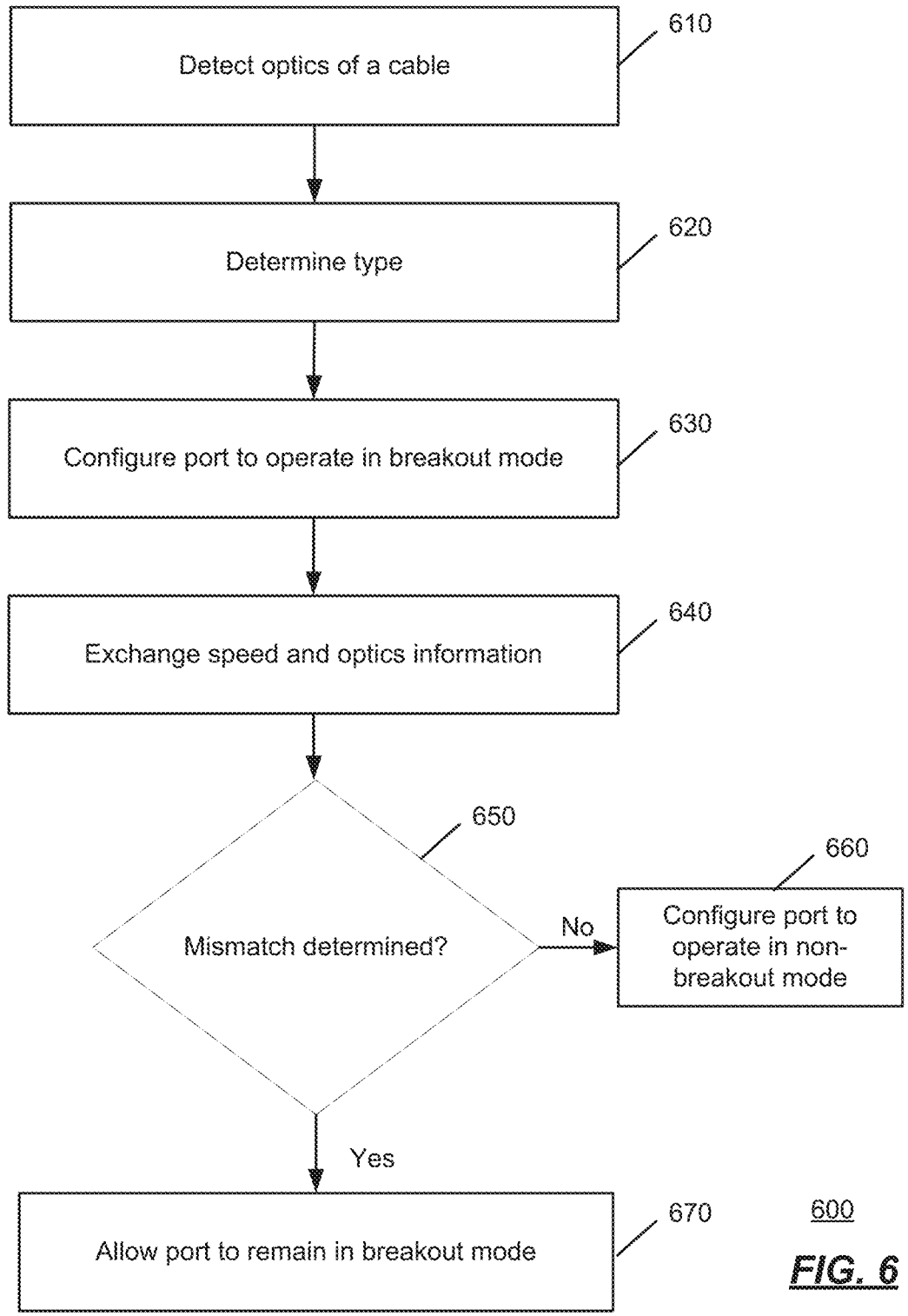
FIG. 6 is an operational flow of an implementation of a method for configuring a port to operate in either a breakout or a non-breakout mode.

FIG. 6 is an operational flow of an implementation of a method 600 for configuring a port to operate in either a breakout or a non-breakout mode. The method 600 may be implemented by one or both of a spine node 120 or a leaf node 140.

At 610, an optics of a cable is detected. The optics of the cable 160 may be detected in a port by the processing modules on both of the leaf node(s) 140 and the spine node 120. In some embodiments, the optics of the cable 160 may be detected by a driver associated with the port.

At 620, a type of the optics is determined. The type of the optics may be detected by the processing module (or driver) reading data from a memory of the cable 160. The memory may be a SPROM or an EPROM, for example. Note that some cables 160 such as optical cables may not have associated memories and the type may not be determinable in such cases.

At 630, the port is configured to operate in breakout mode. The port may be configured by a processing module of either the spine node 120 or the leaf node(s) 140 using an internal configuration.

At 640, speed and optics information is exchanged. The information may be exchanged between the spine node 120 and the leaf node(s) 140 through the cable 160. In some embodiments, the information may be encoded into a specialized TLV and exchanged via LLPD. Other methods for exchanging information may be used.

At 650, whether there is a mismatch in the exchanged information is determined. The mismatch may be determined by the processing modules on both of the leaf node(s) 140 and the spine node 120. Depending on the embodiment, a mismatch may be determined when either the exchanged optics type or speed information does not match. Any methods for determining mismatches may be used. If a mismatch is determined the method 600 may continue at 670. If no mismatch is determined then the method 600 may continue at 660.

At 660, the port is configured to operate in non-breakout mode. The port may be configured by the processing modules on both of the leaf node(s) 140 and the spine node 120.

At 670, the port is allowed to remain in breakout mode. The port may be allowed to remain in breakout mode by the processing modules on both of the leaf node(s) 140 and the spine node 120.

Figure 7:
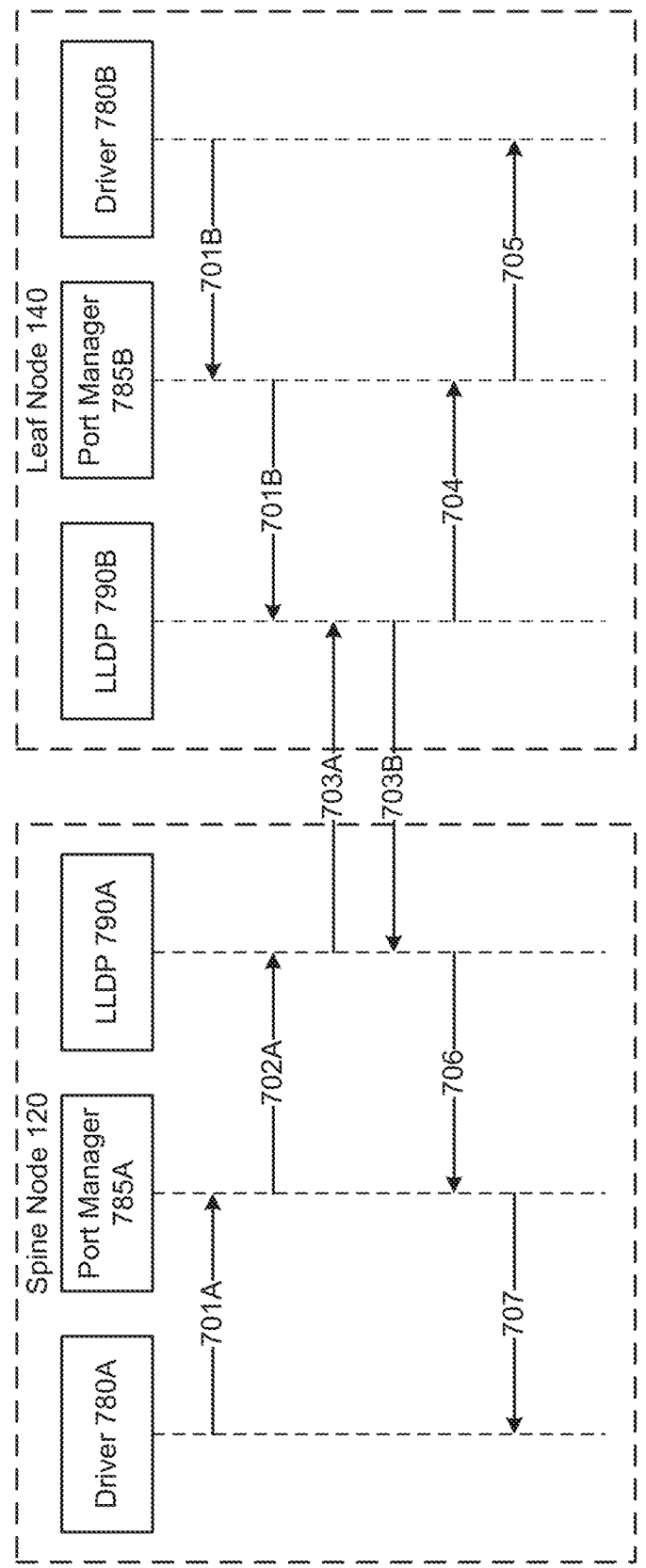
FIG. 7 is an illustration of an implementation of a method for configuring ports in both a spine node and a leaf node.

FIG. 7 is an illustration of an implementation of a method 700 for configuring ports in both a spine node and a leaf node. As shown, each of the spine node 120 and the leaf node 140 includes a driver 780 (the drivers 780A and 780B), a port manager 785 (the port managers 785A and 785B), and an LLDP 790 (the LLDP 790A and 790B). The method 700 may begin when a cable 160 is plugged into the ports of the spine node 120 and the leaf node 140.

At 701A, the driver 780A of the spine node 120 detects the presence of optics of the cable 160. Similarly, at 701B, the corresponding driver 780B of the leaf node 140 detects the presence of optics of the cable 160. In response, each driver 780 may read optics SPROM content, may parse the content, and may pass it to the corresponding port manager 785. The content may include a speed and optics type of the cable 160. The port manager 785 may be a user-space level OS process that handles ethernet interfaces.

At 702A, the port manager 785A of the spine node 120 passes the parsed content to the LLDP 790A. Similarly, at 702B, the port manager 785B of the leaf node 140 passes the parsed content to the LLDP 790B.

At 703A, the LLDP 790A of the spine node 120 sends the parsed content to the LLDP 790B of the leaf node 140 in an LLDP Data Unit ("LLDPDU"). Similarly, at 703B, the LLDP 790B of the leaf node 140 sends the parsed content to the LLDP 790B of the spine node 120 in an LLDPDU.

At 704, the LLDP 790B of the leaf node 140 receives the LLDPDU, extracts the speed and optics information, and forwards it to the port manager 785B. If the port manager 785B determines that the speed and optics information match its own speed and optics information, the port manager 785B instructs the driver 780B to remove the breakout from the port at 705. Else, the port manager 785B allows the breakout to remain.

At 706, the LLDP 790A of the spine node 120 receives the LLDPDU, extracts the speed and optics information, and forwards it to the port manager 785A. If the port manager 785A determines that the speed and optics information match its own speed and optics information, the port manager 785A instructs the driver 780A to remove the breakout from the port at 707. Else, the port manager 785A allows the breakout to remain.

Figure 8:
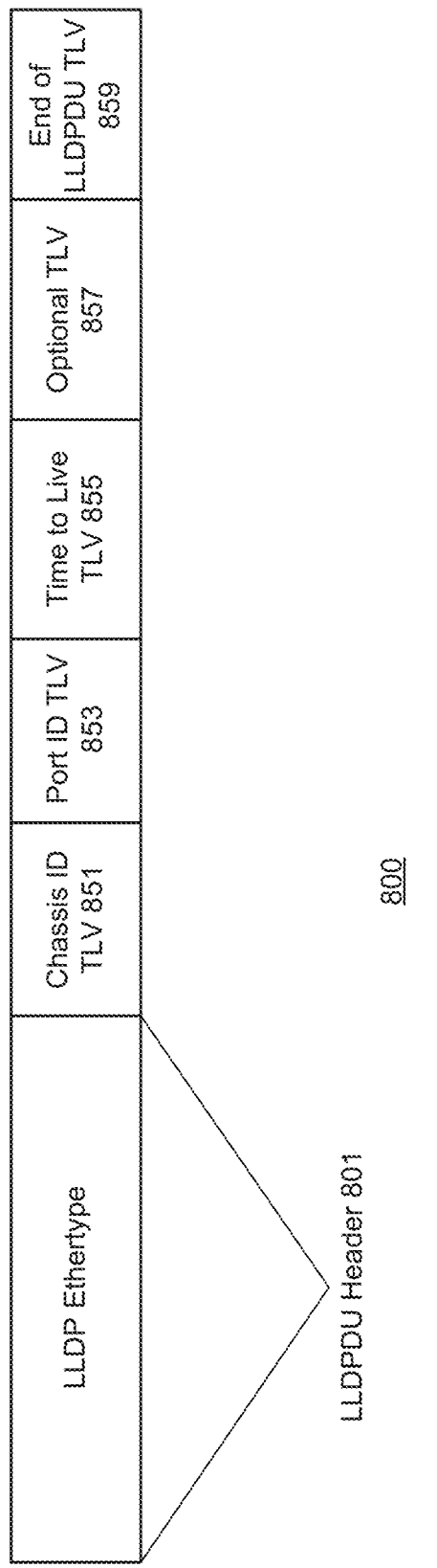
FIG. 8 is an illustration of an example LLDPDU that can be used as part of port configuration.

FIG. 8 is an illustration of an example LLDPDU 800 that can be used as part of port configuration. In particular the LLDPDU 800 may be used to exchange the speed and optics information that is used by the spine node 120 and leaf nodes 140 to determine whether to configure ports to operate in breakout mode or non-breakout mode.

As shown, the LLDPDU 800 includes a LLDPDU header 801, a Chassis ID Type-Length Value ("TLV") 851, a Port ID TLV 853, a Time to Live TLV 855, an optional TLV 857, and an End of LLDPDU TLV 859. The size of the LLDPDU 800, including header the 801, is the same as one Ethernet frame.

The TLVs 851, 853, 855, and 859 are what are referred to as mandatory TLVs and cannot be used for other purposes. The optional TLV 857 is not mandatory and can be configured to include any values. Accordingly, the spine node 120 and the leaf node 140 may use the optional TLV 857 to transmit the speed and optics information for the cable 160. Depending on the embodiment, the spine node 120 and the leaf node 140 may use a TLV type of 127 in the optional TLV 857 which is a TLV type that is reserved for organization specific extensions.

Figure 9:
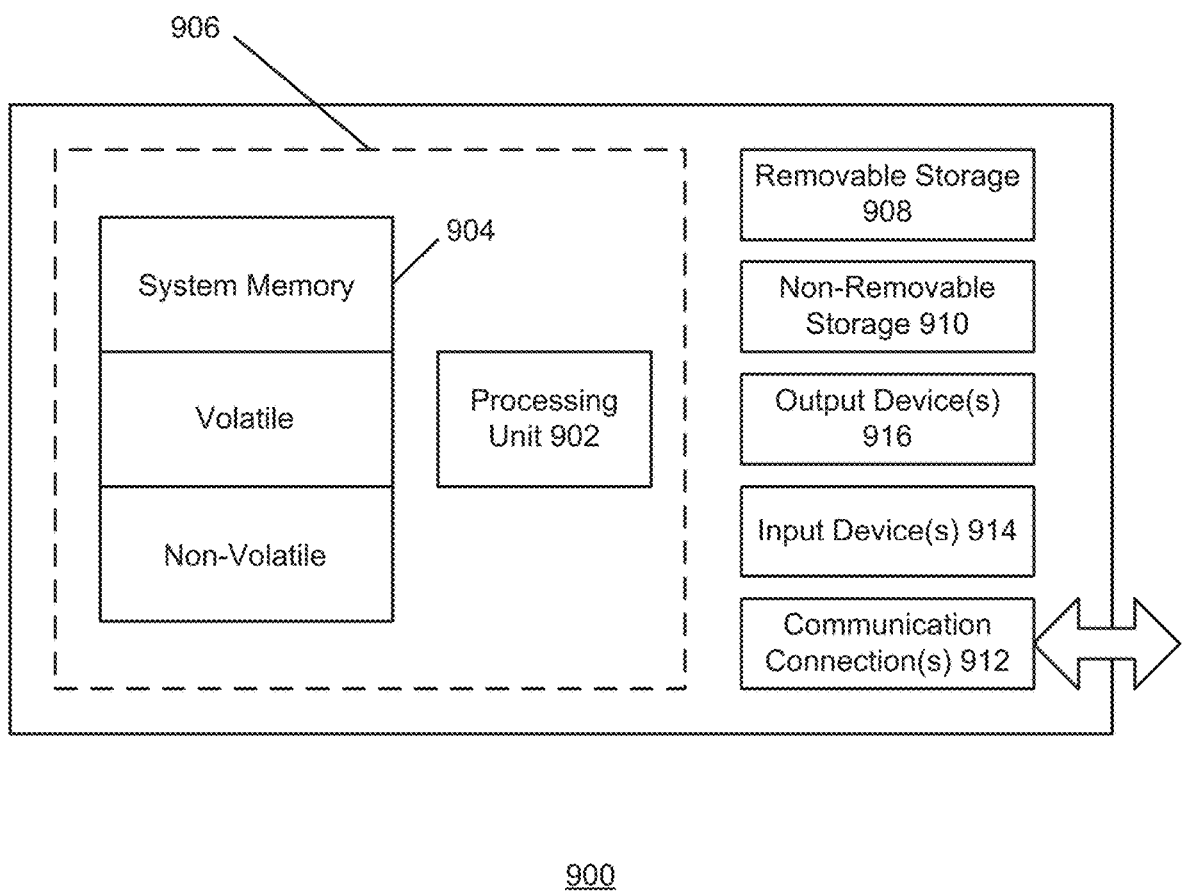
FIG. 9 shows an exemplary computing environment in which example embodiments and aspects may be implemented.

FIG. 9 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 9, an exemplary system for implementing aspects described herein includes a computing device, such as computing device 900. In its most basic configuration, computing device 900 typically includes at least one processing unit 902 and memory 904. Depending on the exact configuration and type of computing device, memory 904 may be volatile (such as random access memory (RAM)), non-volatile (such as read-only memory (ROM), flash memory, etc.), or some combination of the two. This most basic configuration is illustrated in FIG. 9 by dashed line 906.

Computing device 900 may have additional features/functionality. For example, computing device 900 may include additional storage (removable and/or non-removable) including, but not limited to, magnetic or optical disks or tape. Such additional storage is illustrated in FIG. 9 by removable storage 908 and non-removable storage 910.

Computing device 900 typically includes a variety of computer readable media. Computer readable media can be any available media that can be accessed by the device 900 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 904, removable storage 908, and non-removable storage 910 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of computing device 900.

Computing device 900 may contain communication connection(s) 912 that allow the device to communicate with other devices. Computing device 900 may also have input device(s) 914 such as a keyboard, mouse, pen, voice input device, touch input device, etc. Output device(s) 916 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.3 networks, the present invention can be used in connection with any suitable wired network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A spine node comprising:
   a plurality of ports; and a processing module configured to:
   detect an optics of a cable connected to a first port of the plurality of ports, wherein the optics of the cable connects the first port of the spine node to a second port of a leaf node;
   configure the first port to operate in a breakout mode;
   exchange speed and optics information with the leaf node; and
   based on the exchanged speed and optics information, allow the first port to remain operating in the breakout mode.

2. The spine node of claim 1, wherein the cable is a direct attached breakout cable, and the processing module is further configured to detect a type of the cable by reading SPROM or EEPROM content stored on the cable.

3. The spine node of claim 1, wherein configuring the first port of the spine node to operate in the breakout mode comprises applying a breakout configuration to the first port.

4. The spine node of claim 1, wherein the cable is an optical cable.

5. The spine node of claim 4, wherein the optical cable is a single mode fiber (SMF) cable.

6. The spine node of claim 1, wherein the processing module is further configured to:
   based on the exchanged speed and optics information determine that there is a mismatch between the first port and the second port; and in response to the determination of the mismatch, allow the first port to remain operating in the breakout mode.

7. The spine node of claim 1, wherein the processing module is further configured to:
   based on the exchanged speed and optics information determine that there is no mismatch between the first port and the second port; and
   in response to the determination of no mismatch, configure the first port of the spine node to operate in the non-breakout mode.

8. The spine node of claim 1, wherein the speed and optics information are exchanged using a link layer discovery protocol.

9. A method comprising:
   detecting optics and intent of a cable connected to a port of a spine node, wherein the cable connects a port of a leaf node to the port of the spine node;
   configuring the port of the spine node to operate in a breakout mode by the spine node;
   exchanging speed and optics information with the leaf node by the spine node; and
   based on the exchanged speed and optics information, allow the port of the spine node to remain operating in the breakout mode.

10. The method of claim 9, further comprising:
detecting the optics and the intent of the cable connected to the port of the leaf node; and
configuring the port of the leaf node to operate in the breakout mode by the leaf node.

11. The method of claim 9, wherein the cable is a direct attached breakout cable, and further comprising detecting a type of the cable by reading SPROM or EEPROM content stored on the cable.

12. The method of claim 9, wherein configuring the port of the spine node to operate in the breakout mode comprises applying a breakout configuration to the port of the spine node.

13. The method of claim 9, wherein the cable is an optical cable.

14. The method of claim 13, wherein the optical cable is a single mode fiber (SMF) cable.

15. The method of claim 9, further comprising:
   based on the exchanged speed and optics information, determining that there is a mismatch between the port of the spine node and the port of the leaf node; and
   in response to the determination of the mismatch, allowing the port of the spine node to operate in the breakout mode.

16. The method of claim 9, further comprising:
   based on the exchanged speed and optics information, determining that there is no mismatch between the port of the spine node and the port of the leaf node; and
   in response to the determination of no mismatch, configuring the port of the spine node to operate in the non-breakout mode.

17. The method of claim 9, wherein the speed and optics information is exchanged using a link layer discovery protocol.

18. A system comprising:
   a spine node comprising a first plurality of ports; and
   a leaf node comprising a second plurality of ports; and
   wherein the spine node is configured to:
      detect an optics of a cable connected to a first port of the first plurality of ports, wherein the cable connects the first port to a second port of the second plurality of ports;
      configure the first port to operate in a breakout mode;
      exchange speed and optics information with the leaf node; and
      based on the exchanged speed and optics information, allow the first port to remain operating in the breakout mode.

19. The system of claim 18, wherein the leaf node is configured to:
   detect the optics of the cable connected to the second port of the leaf node; and
   configuring the second port of the leaf node to operate in the breakout mode by the leaf node.

20. The system of claim 18, wherein the leaf node and the spine node are switches.

* * * * *